United States Patent Office 2,822,064
Patented Feb. 4, 1958

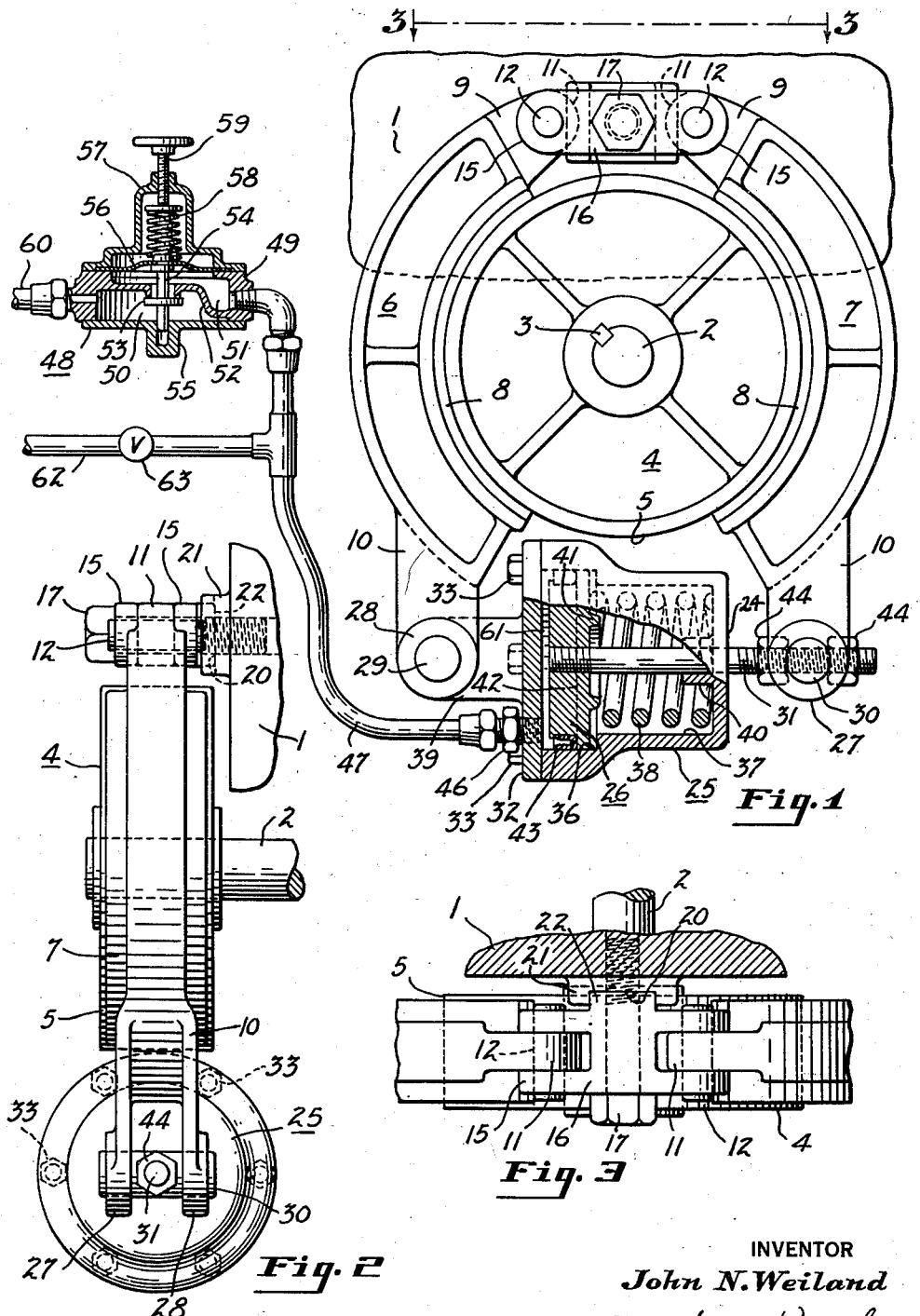

2,822,064

BRAKE STRUCTURE AND MOUNTING MEANS THEREFOR

John N. Weiland, Cleveland, Ohio

Application May 19, 1953, Serial No. 356,000

5 Claims. (Cl. 188—75)

This invention relates to brakes, more particularly to brakes of the type used in apparatuses having frame or base members and other members or shafts rotatable in the base members, the brake structures being carried by the base members and frictionably engageable with the rotatable members for controlling the rotation of the latter.

In rotation controlling brakes of the character mentioned considerable effort has been made to obtain uniform frictional engagement between the rotatable member and the friction surfaces or linings of the brake shoes so that a smooth braking action results and wear on the linings is minimized and distributed evenly over the surfaces of such linings.

The present invention has for its general objective the provision of an improved brake structure which obtains the desired smooth braking action and in which the wear is distributed evenly over the friction surfaces of the brake shoes. As an incidental result of smooth braking action with the frictional grip between the rotatable member and the brake shoes distributed evenly over the surfaces of the latter, the stresses imposed on the structure are reduced by reason of elimination of shocks and impacts so that light weight components can be used, this being a further objective of the invention. The light weight construction obtains quick acting characteristics, reduces the force required to actuate the brake and obtains economies in manufacture.

Another object of the invention is to provide a brake structure of the type referred to which is adaptable for use on various and different kinds of machines and apparatuses and which can be readily mounted with little modification of the machine or apparatus. More specifically it is sought to provide a brake structure that comprises the combination of a rotatable member to be carried by the shaft or other rotating machine part to be controlled and a shoe assembly that has a single point of attachment to the base structure of the machine or apparatus. In a specialized version concerned with this aspect of the invention the contemplated structure comprises a plurality of shoes carried by a common support member fastened to the base or frame of the machine, preferably in rigid relation, by a single stud, the shoes in turn supporting a fluid motor actuator the components of which shift bodily with the brake shoes.

In a further refinement of the invention and as an additional objective thereof the brake shoes are identical in construction, are supported for swinging movement about separate spaced parallel axes, and are each pin-connected to one of the relatively movable parts of the fluid motor which they support.

Another objective of the invention is to provide an improved fluid motor actuator for direct connection to the movable shoes of a brake structure, the fluid motor preferably being adapted to be suspended between corresponding ends of the brake shoes.

In the preferred arrangement the fluid motor is spring biased normally to hold the brake shoes clamped in frictional engagement with the rotatable member that is to be controlled so that when the fluid motor is energized the fluid pressure acts against the spring to release the brake. In one version of such a spring-set fluid-pressure-release brake, the fluid is supplied to the motor through a pressure controlling valve which permits opposing the brake setting spring force to any desired degree. Thus a further objective of the invention is achieved in that by presetting the pressure control valve the degree of brake release may be predetermined, and by varying the pressure control valve, the braking force can be adjusted while the rotatable member is either turning or at rest to obtain a predetermined maximum braking effect.

Other objectives such as those concerned with the provision of a brake simple in design and construction and relatively inexpensive to manufacture are set forth in the following detailed description of a preferred embodiment of the invention, this description being made in connection with the accompanying drawings forming a part of the specification.

In the drawings:

Figure 1 is an elevational view partly diagrammatic, partly in section and with parts broken away and removed showing the preferred brake structure of the present invention as applied to a press or other machine having a rotatable member or shaft, the details of the machine being largely omitted;

Fig. 2 is a side view of the same brake structure and machine with the machine being largely broken away and removed; and Fig. 3 is a fragmentary detail, partly in section and with parts removed, this view being taken substantially along the line indicated at 3—3 of Figure 1.

The present brake structure is especially suited for use in controlling the rotation of shafts of presses and similar machines although of course it has numerous other useful applications in industry. The illustrative embodiment is shown in connection with a machine comprising a frame or base 1, which carries or has journalled therein a rotatable shaft 2. Mounted on the shaft 2 and secured against rotation as by a key 3 is a flywheel member 4 having a cylindrical friction surface 5. The flywheel and the shaft on which it is mounted constitute the member the rotation of which is to be controlled. Since the example shown is a contracting type of brake the cylindrical friction surface 5 is outwardly directed, it being understood of course, that in an expanding type of brake structure the cylindrical surface is directed inwardly.

A pair of arcuate segmental brake shoes 6 and 7 are disposed embracingly about the rotatable flywheel member 4, the shoes having inwardly directed cylindrically curved surfaces against which are secured flat strip friction linings 8 that engage the surface 5 of the rotatable flywheel member 4. The brake shoes 6 and 7 are preferably identical in construction, each being formed at one or its upper end with a circumferential extension 9 by means of which the shoe is mounted and at its other or lower end with an angularly disposed arm 10 which is connected to and supports the actuator. The upper extensions 9 are formed at their ends with eyes 11 received on pins 12 carried by the oppositely directed and preferably bifurcated ends 15 of a mounting bracket 16, the latter being secured to the machine base 1 as by a single stud or capscrew 17. The pins 12 are secured against turning in either the eyes on the extensions 9 of the brake shoes or in the apertures provided therefor in the spaced parts of the bifurcated ends of the mounting bracket. The brake shoe extensions and the bracket ends are thus arranged in interfitting relation in the provision of clevis joints. The two brake shoes are supported by the pins for swinging movement toward and away from the cylindrical surface 5 of the rotatable member or flywheel 4, the swing or pivot axes of the shoes being spaced from and parallel one another and parallel to and equidistant from the rotational axis of the shaft 2. Suitable provision is made for restraining the supporting bracket 16 against relative turning and shifting on the base or frame 1. This securement of the bracket in rigid relation to the machine frame is effected as by supplemental studs or screws or, as shown, by an interfitting relationship between the parts comprising a groove 20 milled or otherwise formed in a boss or mounting pad 21 on the machine frame or base 1 and a tongue or projection 22 on the bracket 16 that fits snugly in the groove 20.

Securement of the mounting bracket 16 against turning on the stud or screw 17 retains the pins 12 on which the brake shoes are pivoted at constant and equal distances from the axis of the shaft 2. This feature maintains the brake shoes 6 and 7 in concentric relation to the friction surface 5 so that linings 8 engage the friction surface 5 uniformly and smoothly in the elimination of grabbing and chattering and in obtaining even wear.

Disposed in the space between the lower ends of the brake shoes 6 and 7 and suspended between the arms 10 so as to be wholly supported by the brake shoes is an actuator which desirably takes the form of a fluid motor comprising an enclosing cylinder 25 and a piston 26 contained therein, the piston being spring biased and operated by fluid pressure, as will appear. Each of the angularly disposed arms 10 is bifurcated at its lower extremity in the provision of spaced parallel portions 27 and 28 (Fig. 2) formed with aligned openings to journal a cross pin. Pin 29 carried in the bifurcated end of the arm on the shoe 6 is received through an opening in an integral axial extension 39 of a circular cylinder head or cover 32, the cover being secured as by cap screws 33 across the end of the cylinder 25. The end of the extension 31 is disposed between the arm portions 27 and 28 and carries a set screw (not shown) which bears against the pin 29 to secure the latter against endwise movement.

Pin 30, carried in the bifurcated end of the arm 10 on the shoe 7, is formed midway of its ends with a diametrical drill hole that receives one of the threaded ends of a piston rod 31 in a sliding fit for endwise adjustment of the rod. Nuts 44 threaded on the rod and received against opposite sides of the pin 30 lock the rod in adjusted position and transmit the thrust of the rod to the pin. This rod extends through a central guide hole in end 24 of the cylinder 25, the other threaded end of the rod being secured tightly in an axial threaded socket in the disc-like piston 26.

The cylinder 25 may comprise a turning or casting of iron, brass, semisteel or the like and is made in the form of a cup having coaxial chamber portions 36 and 37 of different diameters continuous with one another. The piston 26 is slidingly received in the larger diameter but axially shorter cylindrical chamber portion 36. The smaller but axially relatively longer chamber portion 37 receives a helical coil compression spring 38 interposed under compression between the piston 26 and the end wall 32. The end wall 32 is desirably integral with the cylindrical walls forming the chamber portions 36 and 37 and may include a central tubular extension 40, preferably directed inwardly, which embraces the piston rod 31 and constitutes an elongated guide for the latter. An annular shoulder is thus formed between the coaxial cylindrical chamber portions 36 and 37. This shoulder serves as a stop engageable by the piston 26 to limit the coaxial travel of the latter when fluid pressure is introduced into the working or large diameter end of the cylinder. When fluid is introduced at relatively high pressure to provide the desired instantaneous release of the braking the piston travel is limited to the relatively short distance required for the brake release, the piston bottoming against the integral annular shoulder at the juncture of the two chamber portions of different diameters. The limitation of piston travel in this manner avoids collapsing of the spring 38 and, upon release of the fluid pressure, permits rapid re-application of the braking force to the rotatable member 4.

The piston 26 is formed on one end face with a projection or series of projections 41 that locate and center the helical spring 38 in coaxial relation to the piston rod 31 so as to prevent sliding of the spring against the walls of the cylinder. A rabbet 42 on the periphery of the piston and completely annular in extent receives a gasket 43 of rubber or the like which effects a substantially fluid tight seal between the piston and the cylindrical wall of the large diameter chamber portion 36. Desirably the gasket 43 is U shaped in radial cross section providing concentric flexible flange portions, each completely annular in extent, for sealing engagement with the cylinder wall and with the cylindrical wall of the rabbet, respectively.

In assembling the fluid motor or actuator the spring 38 is placed under compression so that the piston 26 is normally urged or biased by the spring to closed position or to the left, as viewed in Fig. 1. Thus the actuator normally draws the brake shoe extensions 10 toward one another to clamp the shoes about the rotatable member 4. Adjustment of the actuator to effect the desired gripping of the cylindrical surface 5 by the brake shoe linings 8 in the full "on" condition is effected by the nuts 44 on the threaded end of the piston rod 31.

To release the brake to permit free turning or any desired degree of restricted turning of the rotatable member 4 and the shaft 2 relative to the frame or machine base 1, air or other fluid under pressure is introduced into the cylinder 25 between the piston 26 and the cover 32. For this purpose a fitting 46 is secured in a threaded opening through the cover 32 and receives a flexible tubular conduit 47 which is connected to a fluid pressure source through suitable valves and controls. In one arrangement a pressure regulating valve 48 is interposed in the fluid supply line 47 so that the fluid supplied to the piston-cylinder combination does not exceed a predetermined maximum. By adjusting the control valve 48 the extent of the brake releasing action by fluid pressure can be readily controlled.

Various types of pressure regulating valves may be used, the particular construction of the valve not being involved in the present invention. A suitable valve embodies a body 49 divided into chambers 50 and 51 by an internal partition 52. The partition is apertured and formed with a valve seat engageable by a valve body 53 carried on a rod 54. One end of the rod is guided in a socket formed in a cover or cap 55 disposed across and closing one side of the body chamber 50. The other end of the valve rod 54 extends upwardly through the chamber 51 and is secured to a flexible diaphragm 56 across and closing the chamber 51, the diaphragm being held between the body 49 and a bell shaped cover or cap 57. A spring 58, adjustable by a hand wheel screw 59 threaded through the end of the bell cap 57 in coaxial relation, applies axial pressure to the rod 54 to unseat the valve body 53 and permit the passage of air or other fluid through the regulating valve. Valve body 53 also responds to back pressure in the lines 47 and chamber 51 which acts on the flexible diaphragm 56 in opposition to the helical coil spring 58 to seat the valve body 53. A tubular conduit 60 which extends as a continuation of the supply conduit 47 beyond the regulating valve 48 may lead through one or more shutoff or brake controlling valves (not shown) to the pressure fluid source to govern the supply of air or other fluid under pressure to the regulating valve 48 and the piston-cylinder assembly.

In using the present brake structure as an overload release or the like the parts may be arranged as shown and a predetermined fluid pressure maintained in space 61 at the head of the piston 26, the pressure of the fluid being regulated by the valve 48 to the desired constant value. The uniform pressure thus maintained in the cylinder of the piston-cylinder assembly opposes the brake applying action of the spring 38 in effecting "partial" release of the brake. Variation of the fluid pressure in the cylinder chamber 61 is thus a convenient method of varying the frictional grip of the brake shoes 6 and 7 on the rotatable member 4. This arrangement permits pre-setting of the device to allow rotation of the member 40 relative to the machine frame or base 1 at any desired torque differential and also permits remote control for varying the overload setting and for applying and releasing the brake as well.

The air or other fluid from the high pressure source may be by-passed around the pressure regulating valve 48 as through a conduit 62 connected to the conduit 47 by a T at a point intermediate the cylinder 25 and the valve 48. A shut-off valve 63, manually or otherwise operated, controls the supply of fluid or air through the conduit 62 for controlling the operation of the brake actuator. The valves or either of them may be situated at a distance from the brake is desired to provide convenient remote control of the brake or overload mechanism, and either of the valves may, of course, be omitted.

The present invention thus provides a brake or overload structure which is easily attached to a press or other apparatus requiring control of the rotation of a shaft or other member relative to a supporting frame or the like. By reason of the compact design which places the actuator or fluid motor between the ends of the brake shoes the system is readily adapted to various types of machines and equipment, the space requirements being held to a minimum. Supporting the actuator wholly by the brake shoes facilitates the mounting installation. There is required merely the attachment to the machine frame, using a locating template, of the single stud or screw 17 and the placing of the flywheel or rotatable member 4 on the machine shaft 2. The use of brake shoes of identical structure and configuration reduces the cost and simplifies repair and replacement in the field.

In accordance with the patent statutes the principles of the present invention may be utilized in various ways, numerous modifications and alterations being contemplated, substitution of parts and changes in construction being resorted to as desired, it being understood that the embodiment shown in the drawings and described above is given merely for purposes of explanation and illustration without intending to limit the scope of the claims to the specific details disclosed.

What I claim and desire to secure by Letters Patent of the United States is:

1. In the combination of a machine having an upright frame, a member mounted on the frame for rotation about a horizontal axis, and a brake structure controlling the rotation of said member, said brake structure comprising a pair of shoes disposed embracingly about the rotatable member, a bracket disposed above the rotatable member and formed with a central opening, a single elongated element fast to the frame and extending through the bracket opening, the single elongated element constituting the sole means attaching the bracket to the frame, the longitudinal axis of said attaching element being parallel to the rotational axis of the rotatable member, the bracket being held against the frame by the elongated element in rigid fixed relation and against lateral shifting movements relative to the frame, pin means connecting the shoes to the bracket for pivotal movements about horizontal axes parallel to one another and also parallel to the axis of the attaching element, an actuator wholly supported by and connected between the shoes for shifting the shoes between engaged and disengaged positions relative to the rotatable member, and the shoes being suspended from and wholly supported by the bracket whereby in disengaged positions wherein the shoes are clear of the rotatable member the combined weight of the bracket, the shoes and the actuator is carried by the single elongated attaching element.

2. In the combination of a machine having an upright frame, a member mounted on the frame for rotation about a horizontal axis, and a brake structure controlling the rotation of said member, said brake structure comprising a pair of shoes disposed embracingly about the rotatable member, a bracket having a central lateral projection on one side and being formed with an opening extending through the lateral projection, means attaching the bracket to and with the lateral projection abutted against the frame, said attaching means comprising an elongated fastening element extending through the bracket opening and fast to the frame, the longitudinal axis of said attaching element being parallel to the rotational axis of the rotatable member, the bracket being held against the frame by the elongated element in rigid fixed relation and against lateral shifting movements relative to the frame, pin means connecting the shoes to the bracket for pivotal movements about horizontal axes parallel to one another and also parallel to the axis of the attaching element, an actuator wholly supported by and connected between the shoes for shifting the shoes between engaged and disengaged positions relative to the rotatable member, and the shoes being suspended from and wholly supported by the bracket whereby in disengaged positions wherein the shoes are clear of the rotatable member the combined weight of the bracket, the shoes and the actuator is carried by the single elongated attaching element.

3. In the combination of a machine having an upright frame, a member mounted on the frame for rotation about a horizontal axis, and a brake structure controlling the rotation of said member, said brake structure comprising a pair of shoes disposed embracingly about the rotatable member, a bracket disposed above the rotatable member and formed with a central opening, a single elongated element fast to the frame and extending through the bracket opening, the single elongated element constituting the sole means attaching the bracket to the frame, the machine frame and the bracket being formed one with a groove and the other with a projection receivable in the groove in the provision of an interlock preventing relative rotation, the longitudinal axis of said attaching element being parallel to the rotational axis of the rotatable member, the bracket being held against the frame by the attaching means in rigid fixed relation, pin means connecting the shoes to the bracket for pivotal movements about horizontal axes parallel to one another and also parallel to the axis of the attaching element, an actuator wholly supported by and connected between the shoes for shifting the shoes between engaged and disengaged positions relative to the rotatable member, and the shoes being suspended from and wholly supported by the bracket whereby in disengaged positions wherein the shoes are clear of the rotatable member the combined weight of the bracket, the shoes and the actuator is carried by the single elongated attaching element.

4. In the combination of a machine having an upright frame, a member mounted on the frame for rotation about a horizontal axis, and a brake structure controlling the rotation of said member, said brake structure comprising a pair of shoes disposed embracingly about the rotatable member, a bracket formed with a central opening, means attaching the bracket to the frame, said attaching means comprising an elongated element extending through the bracket opening and secured to the frame, the attaching element being formed with a threaded portion and having its long axis parallel to the rotational axis of the rotatable member, means coacting with the threaded portion of the attaching element to draw the bracket strongly against the frame to hold the bracket in rigid fixed relation to the frame, pin means connecting the shoes to the bracket for pivotal movements about horizontal axes parallel to one another and also parallel to the axis of the attaching element, an actuator wholly supported by and connected between the shoes for shifting the shoes between engaged and disengaged positions relative to the rotatable member, and the shoes being suspended from and wholly supported by the bracket whereby in disengaged positions wherein the shoes are clear of the rotatable member the combined weight of the bracket, the shoes and the actuator is carried by the single elongated attaching element.

5. In the combination of a machine having an upright frame, a member mounted on the frame for rotation about a horizontal axis, and a brake structure controlling the rotation of said member, said brake structure comprising a pair of shoes disposed embracingly about the rotatable member, a pair of brake shoe pivot pins, a bracket receiving and supporting said pivot pins with their axes in spaced parallel relation, the bracket having a transverse through opening midway between the pins, a single elongated element fast to the frame and extending through the bracket opening, the single elongated element constituting the sole means attaching the bracket to the frame, the longitudinal axis of said attaching element being parallel to the rotational axis of the rotatable member, the bracket being held against the frame by the elongated element in rigid fixed relation and against lateral shifting movements relative to the frame, the shoes being received on the pins and supported thereby in pivotal relation to the fixed bracket, and an actuator wholly supported by and connected between the shoes for shifting the shoes between engaged and disengaged positions relative to the rotatable member, whereby in disengaged positions wherein the shoes are clear of the rotatable member the combined weight of the bracket, the shoes and the actuator is carried by the single elongated attaching element.

References Cited in the file of this patent

UNITED STATES PATENTS

| | | |
|---|---|---|
| 1,238,313 | McInnerney | Aug. 28, 1917 |
| 1,627,370 | Bayer et al. | May 3, 1927 |
| 1,726,045 | Sneed | Aug. 27, 1929 |
| 2,368,517 | Brimble | Jan. 30, 1945 |